(12) United States Patent
Wylie et al.

(10) Patent No.: US 10,740,347 B1
(45) Date of Patent: Aug. 11, 2020

(54) METHODS AND SYSTEMS FOR DETERMINING SETS AND SUBSETS OF PARAMETRIC DATA

(71) Applicant: Capital One Services, LLC, McLean, VA (US)

(72) Inventors: Stephen Wylie, Carrollton, TX (US); Micah Price, Plano, TX (US); Qiaochu Tang, The Colony, TX (US); Jason Hoover, Grapevine, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/291,191

(22) Filed: Mar. 4, 2019

(51) Int. Cl.
*G06F 16/00* (2019.01)
*G06F 16/25* (2019.01)
*G06N 20/00* (2019.01)
*G06F 16/22* (2019.01)
*G06Q 30/06* (2012.01)

(52) U.S. Cl.
CPC ............ *G06F 16/258* (2019.01); *G06F 16/22* (2019.01); *G06N 20/00* (2019.01); *G06Q 30/0631* (2013.01); *G06Q 30/0639* (2013.01)

(58) Field of Classification Search
CPC ............ G06F 16/245; G06F 16/24558; G06F 16/24561; G06F 16/24578; G06Q 30/0631; G06Q 30/0639; H04L 67/306; H04L 29/08936
See application file for complete search history.

(56) References Cited

U.S. PATENT DOCUMENTS

| 6,741,908 | B2 | 5/2004 | Vanderbles et al. |
| 8,219,464 | B2 | 7/2012 | Inghelbrecht et al. |
| 2003/0182568 | A1 | 9/2003 | Snapp et al. |
| 2008/0086755 | A1* | 4/2008 | Darnell ............... H04N 5/44543 725/105 |
| 2013/0124474 | A1* | 5/2013 | Anderson ............. G06F 16/285 707/634 |
| 2015/0088898 | A1* | 3/2015 | Branch .............. G06F 16/24561 707/741 |
| 2015/0363865 | A1 | 12/2015 | Ramanuja et al. |

* cited by examiner

*Primary Examiner* — Dinku W Gebresenbet
(74) *Attorney, Agent, or Firm* — Bookoff McAndrews, PLLC

(57) ABSTRACT

Computer-implemented methods, computer systems, and computer readable media for determining a set of vehicle identifiers. The method includes receiving data, converting the received data to a binary target identifier, comparing the binary target identifier to a domain of binary vehicle identifiers stored in the database, and determining a set of binary vehicle identifiers of the domain of binary vehicle identifiers that correspond to the binary target identifier. The systems include a memory storing instructions and one or more processors configured to execute the instructions to perform operations.

17 Claims, 4 Drawing Sheets

METHODS AND SYSTEMS FOR DETERMINING SETS AND SUBSETS OF PARAMETRIC DATA

TECHNICAL FIELD

Various embodiments of the present disclosure relate generally to arranging data in binary form for efficient data comparisons. More specifically, embodiments of the present disclosure relate to determining a set of items based on a user's preferences and/or the preferences of a population via data arranged in binary form.

BACKGROUND

Users of relatively expensive goods, such as cars, home theaters, mattresses, boats, computers, etc. may conduct part or all of their shopping for such items online, via the internet. In researching and completing such a purchase, a user may have several criteria for that purchase. For example, consumers may have desired criteria regarding the aspects of the good, the availability of the good, or a monetary value of the good. However, the manner in which these criteria are expressed, grouped, or clustered may be inefficient and/or difficult to organize in a meaningful manner. Thus, a user may be unable to sufficiently research their options in selecting such goods. Furthermore, in areas of commerce such as those described above, the amount of information available may be so large as to be prohibitive for an individual consumer to obtain, analyze, and/or synthesize the information. Thus, consumers may make sub-optimal purchase decisions due to a lack of accessible and/or digestible information.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more sets of information. Each of the examples disclosed herein may include one or more of the features described in connection with any of the other disclosed examples.

In one example, a computer-implemented method may be used for determining a set of vehicle identifiers. The method may include receiving data, where the data is indicative of a user's vehicle preferences. The method may include converting the received data to a binary target identifier. The method may include comparing the binary target identifier to a domain of binary vehicle identifiers. The method also may include determining, based on the received data and the comparison of the binary target identifier to the domain of binary vehicle identifiers, a set of binary vehicle identifiers.

The method may further include populating a list of vehicles, wherein each vehicle of the list of vehicles corresponds to a binary vehicle identifier of the set of binary vehicle identifiers. The converting the received data to a binary target identifier may include converting the received data via a hashing medium. The received data may include one or more parameters related to a user's vehicle preferences, such as, for example, vehicle make, vehicle model, vehicle mileage, zip code of vehicle, dealer in possession of vehicle, value of vehicle, condition of vehicle, and/or one or more vehicular luxury features, or combinations thereof. The binary target identifier may include each of the one or more parameters constituting the received data. Each binary vehicle identifier of the set of binary vehicle identifiers of the domain of binary vehicle identifiers may be within a predetermined threshold edit distance from the binary target identifier. The received data may include at least 5 parameters regarding a user's vehicle preferences and may occupy less than or equal to 64 bits. The set of binary vehicle identifiers may be converted to a list of vehicles via a hashing medium.

According to another aspect of the disclosure, a computer system may comprise memory storing instructions, one or more processors configured to execute the instructions, wherein executing the instructions includes performing operations. The operations may include converting data to a binary target identifier. The data may be indicative of a user's vehicle preferences. Other operations include comparing the binary target identifier to a domain of binary vehicle identifiers, determining a set of binary vehicle identifiers of the domain of binary vehicle identifiers that correspond to the binary target identifier, and populating a list of vehicles, wherein each vehicle of the list of vehicles corresponds to a binary vehicle identifier of the set of binary vehicle identifiers.

The computer system may further include instructions for performing an operation where the set of binary vehicle identifiers is converted to a list of vehicles via a hashing medium. The operation of determining a set of binary vehicle identifiers of the domain of binary vehicle identifiers that correspond to the binary target identifier includes applying machine learning to determine which set of binary vehicle identifiers correspond to the binary target identifier. The converted data, after conversion, may occupy less bits than the data prior to the conversion. Further, the data, prior to and after conversion, may comprise one or more parameters related to vehicle make, vehicle model, vehicle mileage, zip code of vehicle, dealer in possession of vehicle, value of vehicle, condition of vehicle, one or more vehicular luxury features, or combinations thereof. The computer system may further include instructions for performing an operation where the binary target identifier is parsed into a plurality of binary numbers, each binary number of the plurality comprising one or more parameters related to vehicle make, vehicle model, vehicle mileage, zip code of vehicle, dealer in possession of vehicle, value of vehicle, condition of vehicle, and/or one or more luxury features of the vehicle. The computer system may further include instructions for performing an operation where the domain of binary vehicle identifiers is culled by removing values above and/or below one or more binary threshold identifiers. The one or more binary threshold identifiers may be calculated based on the binary target identifier. Each binary vehicle identifier of the domain of binary vehicle identifiers may comprise one or more of: 32 bits related to a dealer in possession of vehicle; 17 bits related to a zip code of vehicle, six bits related to a state of vehicle, one bit related to a vehicle pricing, one bit related to a vehicle status condition, or seven bits related to vehicle mileage.

According to some exemplary aspects of the present disclosure, a non-transitory computer-readable media storing instructions that, when executed by one or more processors of a computer system, may cause the one or more processors to perform a plurality of operations. In some exemplary aspects of the present disclosure, the plurality of operations may include receiving data, wherein the data is indicative of a user and converting the received data to a binary target identifier. In some exemplary aspects of the present disclosure, the plurality of operations may include, comparing the binary target identifier to a domain of binary user identifiers and determining a set of binary user identifiers of the domain of binary user identifiers that correspond to the binary target identifier. In further aspects, the plurality of operations may include populating a list of users, wherein each user of the list of users corresponds to a binary user identifier of the set of binary user identifiers.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
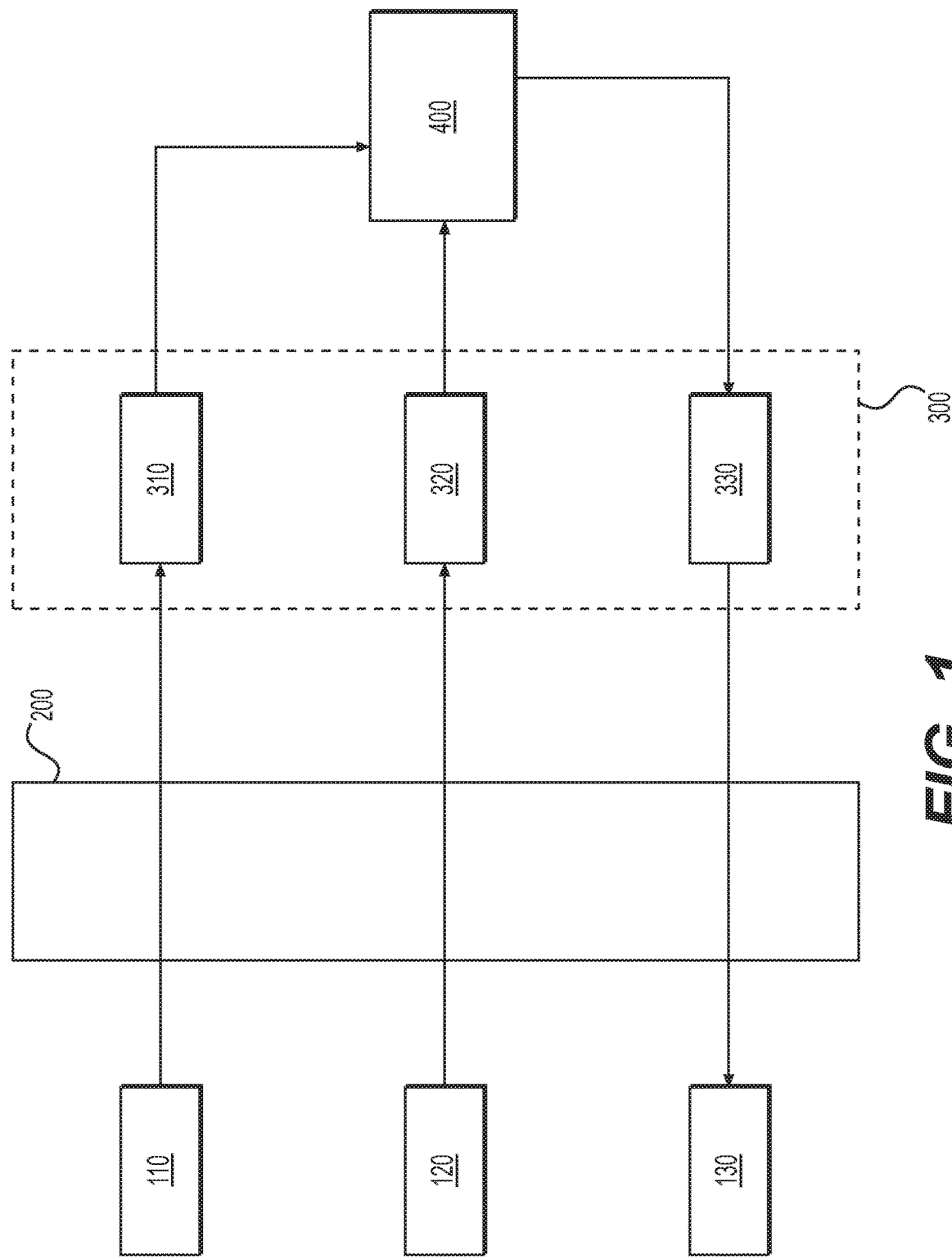
FIG. 1 is a block diagram of a system for determining a set of items based on received data, according to one or more embodiments.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value. Additionally, in this disclosure, the term "computer system" generally encompasses any device or combination of devices, each device having at least one processor that executes instructions from a memory medium. Additionally, a computer system may be included as a part of another computer system.

In general, the present disclosure provides methods and systems for determining a set of items based on received data. For example, a set of purchase recommendations may be generated based on received data indicative of a user's preferences. While automotive vehicles are referenced herein as an exemplary application for the systems and methods described herein, it will be understood that this disclosure is not limited to automotive vehicles and may apply to other contexts, such as real estate, technology, boats, mattresses, electronics, and/or other items. The systems and methods described herein may be used in order to present information to users. For example, the disclosed systems and methods may be used to present information regarding one or more vehicles to a user. In some embodiments, the disclosed systems and methods may be used in order to present information to a dealer or other distributor of goods to users. The disclosed systems and methods also may learn a user's preferences over time and may deliver recommendations to the user in accordance with those preferences. The systems and methods disclosed herein may base these recommendations at least in part based on information gathered regarding the vehicle-purchasing preferences of a population. While the disclosure includes descriptions of exemplary methods, it will be understood that the steps of each method may be combined in various combinations or permutation and/or may be mixed and matched. For example, a step from one exemplary method may be used in conjunction with steps of another exemplary method.

FIG. 1 shows an exemplary system for providing vehicle purchase recommendations. User preference data 110 may be converted via a hashing medium 200 to a binary target identifier 310. A domain of vehicles 120 may be converted to a domain 320 of binary vehicle identifiers via the hashing medium 200. A determination unit 400 may compare the binary target identifier 310 with the domain 320 of binary vehicle identifiers to determine a set of binary vehicle identifiers 330 of the domain 320 of binary vehicle identifiers which correspond to the binary target identifier 310. The set of binary vehicle identifiers 330 may be converted to a list of vehicles 130 (e.g., a list of vehicle purchase recommendations) via the hashing medium 200. In some embodiments, one or more of the binary target identifier 310, domain 320 of binary vehicle identifiers, and set of binary vehicle identifiers 330 may be located on a database 300. In some embodiments, hashing medium 200, database 300, and determination unit 400 may be subsets of one system. In other embodiments, hashing medium 200, database 300, and determination unit may be located across a plurality of systems, each system in communication with the other.

User preference data 110 may include one or more parameters relating to a user's preferences regarding a certain good. For example, user preference data 110 may include information relating to features of a vehicle, availability of a vehicle, or the value of a vehicle. User preference data 110 may be input by a user, input by a dealer or other third-party, collected from a user's activities or behavior (e.g., collected based on a user's internet search history), or estimated from a computer-learning model (e.g., machine learning model) or other statistical model. User preference data 110 may include a plurality of parameters, such as, for example, make of vehicle, model of vehicle, vehicle color, vehicle mileage, one or more parameters relating to the location of the vehicle (e.g., zip code, state, region), dealer in possession of the vehicle, value of vehicle, condition of vehicle, and/or luxury features of the vehicle (e.g., side air bags, sun roof, four-wheel drive, etc.). User preference data 110 may include defined values for each and every parameter. In some embodiments, user preference data 110 may include defined values for one or more parameters and undefined values for one or more additional parameters. For example, user preference data 110 might include information that a given user prefers domestically manufactured blue vehicles, without preference as to the model of vehicle or mileage of vehicle. In such an instance, user preference data 110 may include a value for model of vehicle or mileage of vehicle that indicates these parameters are undefined.

User preference data 110 may include one or more parameters relating to the make of a vehicle. For example, user preference data 110 may include a parameter that distinguishes between domestic and foreign manufacturers. In some embodiments, user preference data 110 may include a parameter that identifies a class, tier, or group of manufacturer, such as, for example, economy value manufacturers, mid-tier manufacturers, or luxury or high-end manufacturers. Additionally, or in the alternative, user preference data 110 may include a parameter that identifies the manufacturer of a vehicle, such as, for example, Fiat, General Motors, Ford, Nissan, Hyundai, Toyota, BMW, Subaru, Volkswagen, Jaguar Land Rover, etc.

User preference data 110 may include one or more parameters relating to the model of a vehicle. For example, user preference data 110 may include a parameter that distinguishes vehicles based on size class, such as, for example, compact, mid-size, full, minivan, truck, or sport-utility vehicle (SUV). User preference data 110 may include one or more parameters relating to the specific design model of a vehicle, such as, for example, Fiat Jeep Cherokee, Chevrolet Malibu, Ford Focus, Nissan Leaf, Hyundai Sonata, Toyota Corolla, BMW 328i, Subaru Outback, Volkswagen Jetta, Jaguar F-type. Further user preference data 110 may include model year of a vehicle (e.g., a specific iteration of a model, or a parameter related to the year of manufacture of the vehicle). In some embodiments, make of vehicle, model of vehicle, or model year may be combined into a single parameter.

User preference data 110 may include one or more parameters relating to the mileage and/or ownership history of a vehicle. For example, one or more parameters may relate to the mileage of a vehicle, the percentage of the mileage of the vehicle incurred in urban driving environments, the number of previous owners of a vehicle, and/or the types of previous owners (e.g., individual, family, corporate, commercial, rental, lessee). The parameters related to mileage of a vehicle may be approximations, such as, for example, mileage to the nearest thousand miles, or mileage to the nearest hundred miles. Mileage may be tolled in terms of miles driven, kilometers driven, gallons of fuel consumed, or other measure of vehicle use.

User preference data 110 may include one or more parameters relating to the location of a vehicle. For example, user preference data 110 may include information relating to the zip code in which the vehicle is currently located, the state in which the vehicle is currently located, and/or other denomination of physical location (e.g., city, county, region, country). These parameters may be combined into a single location-based parameter or may be included redundantly or semi-redundantly within user preference data 110.

In addition to location information, user preference data 110 may include one or more parameters relating to a dealer in possession of a vehicle. In some embodiments, this parameter also may contain information relating to the physical location of the vehicle. These parameters may include an alphanumeric dealer ID or dealership identifier. In some instances, user preference data 110 may include one or more parameters that identify a specific lot, dealership, or parking space the vehicle is located. One or more parameters of user preference data 110 may identify a dealer of a conglomeration of dealers which maintains responsibility and ownership of the vehicle.

User preference data 110 may include one or more parameters relating to the value of a vehicle. The value of a vehicle may be a number related to absolute monetary worth, one or more listed prices, a value of the vehicle suggested by manufacturer, distributor, or seller, or a subjective value that the given user may associate with a vehicle. Further, user preference data 110 may include one or more parameters indicative of value tiers of vehicles, such as, for example, high-end vehicles, mid-tier vehicles, economy vehicles, new vehicles, gently used vehicles, or extensively used vehicles.

User preference data 110 may include one or more parameters related to the condition of a vehicle. For example, one or more parameters of user preference data 110 may contain information including accident history, repair history, current aesthetic or mechanical defects, and/or ownership history of a vehicle.

User preference data 110 may include one or more parameters related to auxiliary features of a vehicle, such as, for example, luxury features, optional add-ons, or safety enhancements. For example, one or more parameters of user preference data 110 may include information related to the presence of sun roof, moon roof, climate controls, four-wheel drive, power windows, side airbags, backup camera, roof rack, integrated smart car technologies (e.g., lane departure detection, dynamic cruise control, braking assist), adjustable user interface (e.g., adjustable pedals, adjustable seats, adjustable steering wheel, seat memory), anti-lock brakes, anti-theft system, entertainment center, remote start, roof rails, smart device integration, WiFi Hotspot, and/or voice-activated command system in a vehicle.

When user preference data 110 is converted to binary target identifier 310 via hashing medium 200, each and every parameter of user preference data 110 may be incorporated into binary target identifier 310. Stated differently, binary target identifier 310 may include each and every parameter constituting user preference data 110. In other embodiments, one or more parameters may not be preserved or may be combined with one or more other parameters during conversion via hashing medium 200. For example, user preference data 110 may include a plurality of parameters related to the location of a vehicle (e.g., state, zip code, region); these parameters may be combined into a single location parameter of binary target identifier 310. In some embodiments, such as embodiments where one or more parameters of user preference data 110 are undefined, one or more parameters of binary target identifier 310 may be defined to be a predetermined binary sequence (e.g., all '0's or all '1's).

Accordingly, binary target identifier 310 may include a plurality of parameters, such as, for example, make of vehicle, model of vehicle, vehicle color, vehicle mileage, one or more parameters relating to the location of the vehicle (e.g., zip code, state, region), dealer in possession of the vehicle, value of vehicle, condition of vehicle, and/or luxury features of the vehicle (e.g., side air bags, sun roof, four-wheel drive). Binary target identifier 310 may include known values for each and every parameter. In some embodiments, binary target identifier 310 may include defined values for one or more parameters and undefined values for one or more additional parameters that are unknown. For example, binary target identifier 310 might include information that a given user prefers pick-up trucks or SUVs, without preference as to the color of the vehicle. In such an instance, user preference data 110 may include a value for vehicle color that indicates no values are known for these parameters. Each parameter of the binary target identifier 310 may occupy a number of bits less than or equal to the number of bits that same parameter of the user preference data 110 occupied prior to binarization of the user preference data 110 via hashing medium 200.

As noted above, user preference data 110 may be converted to binary target identifier 310 via a hashing medium 200. The conversion may occur within database 300 or outside of database 300. Referring to the exemplary environment shown in FIG. 2, user preference data 110 may be transmitted from a user device 150, via a network 250 (e.g., the internet), and received by a system 350. Database 300 may be configured as part of system 350, or database 300 may be in communication with system 350 via network 250 or a local connection. System 350 may be determination unit 400, may include determination unit 400, or may be in communication with determination unit 400, as described in greater detail below.

In some embodiments, user preference data 110 is converted to binary target identifier 310 via hashing medium 200 on user device 150. Binary target identifier 310 may then be transmitted via network 250 and received by system 350. In some embodiments, user device 150 may transmit user preference data 110 to system 350 via network 250. After receiving user preference data 110, system 350 may convert user preference data 110 to binary target identifier 310 via hashing medium 200.

Hashing medium 200 may include one or more hashing functions, reference media, lookup tables, bitmasks, or combinations thereof. The hashing medium 200 may provide a binary identifier of a fixed number of digits for any domain value of any parameter of user preference data 110. For example, hashing medium 200 may include a function which rounds vehicle mileage to the nearest thousand and converts that number to a 7 digit binary number. By way of another example, a reference medium, such as a lookup table, may be used to convert vehicle make, model, and/or color information to a binary number comprising a fixed number of bits. Such reference media or lookup tables may provide a one-to-one correlation of a user preference data 110 parameter value to a binary number with a fixed number of bits (e.g., a parameter of a binary target identifier 310). For example, user preference data 110 indicating a user prefers a grey vehicle could be converted via hashing medium 200 (e.g., reference media or lookup table) to a binary number (e.g., 010). Similarly, user preference data 110 indicating a user would prefer an American-made vehicle could be converted via hashing medium 200 (e.g., reference media or lookup table) to a binary number (e.g., 100). Such hashing medium would also be able to convert user preference data 110 indicating a user prefers a grey American-made vehicle to a binary number (e.g., 010100). In the given example, the output of the hashing medium 200 has fixed addresses for each binary parameter that allows one parameter of user preference data 110 to be converted in combination with, and independently of, other parameters to generate a single binary number (e.g., a binary target identifier 310). In some embodiments, hashing medium 200 is able to convert at least 5 parameters of user preference data 110 into a single, continuous binary number string (e.g., binary target identifier 310). In other embodiments, hashing medium 200 is able to convert at least 6 parameters, at least 7 parameters, at least 8 parameters, or at least 9 parameters of user preference data 110 into a single, continuous binary number string (e.g., binary target identifier 310).

In some embodiments, there is a domain of vehicles 120. Domain of vehicles 120 may represent known vehicles available for purchase. In other embodiments, domain of vehicles 120 may represent all vehicles available for purchase in one legal jurisdiction, all vehicles available for purchase of a certain type, all vehicles available for purchase within a geographic area, all vehicles available for purchase within a certain mileage, all vehicles available for purchase of a common ownership history, collected libraries of vehicles, or unions and/or intersections of the aforementioned domains. In at least one embodiment, domain of vehicles 120 may represent all vehicles for which values for all parameters of user preference data 110 are known. For each vehicle in the domain of vehicles 120, information pertaining to each parameter of that vehicle may be converted to binary numbers via hashing medium 200. The binary number representing the combination of all parameters for each vehicle may be referred to as the binary vehicle identifier. Each binary vehicle identifier refers to a unique combination of parameters for a vehicle of the domain of vehicles 120. In some embodiments, the binary vehicle identifier contains the same number of parameters as the vehicle of the domain of vehicles 120 used to create the binary vehicle identifier. In some embodiments, each of the parameters of each vehicle of the domain of vehicles 120 are converted to a binary vehicle identifier, resulting in a domain 320 of binary vehicle identifiers.

Binary target identifier 310 may contain several binary parameter values at fixed locations within binary target identifier 310. For example, if binary target identifier 310 contains 16 digits (e.g., occupies 16 bits) bits 0-3 may include information related to vehicle make, bits 4-8 may include information related to vehicle model, bits 9-11 may include information related to mileage, and bits 12-15 may include information related to vehicle condition. Each parameter may have a known location within binary target identifier 310 such that a combination of bits of binary target identifier 310 may be parsed to isolate information from one or more parameters of binary target identifier 310. The locations of parameters within binary target identifier 310 are the same as the locations of corresponding parameters within each binary vehicle identifier of the domain 320 of binary vehicle identifiers.

By way of non-limiting example, each vehicle of the domain of vehicles 120 each binary vehicle identifier of the domain 320 of binary vehicle identifiers comprises one or more of: 32 bits related to a dealer in possession of vehicle; 17 bits related to a zip code of vehicle, six bits related to a state of vehicle, one bit related to a vehicle pricing, one bit related to a vehicle status condition, or seven bits related to a vehicle mileage. The values of these six parameters may be converted into a single binary number (via, for example, hashing medium 200), resulting in a binary vehicle identifier. Each vehicle identifier may have, for example, 64 bits representing the parameters (e.g., the six aforementioned parameters). In other embodiments, the binary vehicle identifier may have 256 bits, 128 bits, 32 bits, 16 bits, or 8 bits. The binary vehicle identifier may be configured to represent any number of parameters. Smaller binary vehicle identifiers (e.g., 16-bit or 8-bit) may comprise relatively fewer parameters (e.g., 2 to 6). Larger binary vehicle identifiers (e.g., 256 bit, 64-bit, or 32-bit) may comprise relatively more parameters (e.g., 6 to 25).

In one example, a binary vehicle identifier comprises 64 bits indicative of 6 parameters. For example, the mileage may be converted to a 7-bit binary number, the vehicle condition (e.g., new or used) may be converted to a 1-bit binary number, the vehicle condition for pricing (e.g., new or used) may be converted to a 1-bit binary number, the geographic state the vehicle is located in may be converted to a 6-bit binary number, the zip code the vehicle is located in may be converted to a 17-bit binary number, and the dealer in possession of the vehicle (e.g., Dealer ID) may be converted to a 32-bit binary number. All of the above-noted binary conversions may be accomplished via hashing medium 200. The converted parameters together, in this example, form a 64-bit binary vehicle identifier. Data including the aforementioned parameters of each vehicle of the domain of vehicles 120 may be converted to binary vehicle identifiers, resulting in a domain 320 of binary vehicle identifiers.

Each binary vehicle identifier of the domain 320 of binary vehicle identifiers may contain information regarding the aforementioned parameters in the same location (e.g., address) of the binary vehicle identifier. The address of a parameter is an index of the location of the bits that comprise that binary parameter within the binary vehicle identifier. The bits of a binary vehicle identifier are given addresses from right to left, starting with zero, and each parameter is assigned a contiguous segment of the binary vehicle identifier. For example, in the 64-bit example binary vehicle identifier described above, bits 6-0 of the binary vehicle identifier may correspond to the mileage of the vehicle, bit 7 of the binary vehicle identifier may correspond to a condition of the vehicle (e.g., new or used), bit 8 of the binary vehicle identifier may correspond to one of two classes of vehicles based on value of vehicle (e.g., new or used; economy or luxury), bits 14-9 of the binary vehicle identifier may correspond to the geographic state the vehicle is located in, bits 31-15 of the binary vehicle identifier may correspond to the zip code where the vehicle is located, and bits 63-32 of the binary vehicle identifier may correspond to a dealer/distributor in possession of the vehicle (e.g., Dealer ID).

In some embodiments, binary target identifier 310 may be compared to domain 320 of binary vehicle identifiers and, based on that comparison, a set of binary vehicle identifiers 330 may be determined. Binary target identifier 310 may be compared with domain 320 of binary vehicle identifiers by determination unit 400 and determination unit 400 may determine the set of binary vehicle identifiers 330 which correspond to binary target identifier 310.

Set of binary vehicle identifiers 330 may be determined by comparing each binary vehicle identifier of the domain 320 of binary vehicle identifiers to binary target identifier 310. Each binary vehicle identifier that is within a threshold edit distance of binary target identifier 310 may be selected and included within set of binary vehicle identifiers 330. For example, given a binary target identifier 310 of '01000110' where bits 3-0 ('0110') correspond to a make of a vehicle (e.g., Toyota) and bits 7-4 ('0100') correspond to a model of car (e.g., Corolla), determination unit 400 may compare the binary target identifier 310 to all binary vehicle identifiers of the domain of binary vehicles identifiers 320 and select all binary vehicle identifiers within a threshold edit distance of binary target identifier 310 ('01000110'). For example, each binary vehicle identifier with a value of '0100' for bits 7-4 and/or each binary vehicle identifier with a value of '0110' for bits 3-0 may be selected and included in set of binary vehicle identifiers 330. In this example, other binary vehicle identifiers also may be included in the set of binary vehicle identifiers 330 such as those corresponding to similar models of vehicles, for example, models in the same class (e.g., Camry).

Determination unit 400 may employ one or more bit-mask and/or one or more Boolean operations to determine a set of binary vehicle identifiers 330. For example, a bit-mask may be generated based on the parameters a user feels are most important. As described previously, when one or more parameters are not defined or are deemed unimportant by the user, the binary target identifier 310 may contain a sequence at the location of that parameter indicative that the parameter is undefined or not important (e.g., all '0's or all '1's). The bit-mask may then be compared to each binary vehicle identifier of the domain 320 of binary vehicle identifiers by a Boolean operation (e.g., AND, OR, NOR), and the resulting binary strings of the Boolean operation may then be compared to each binary vehicle identifier of the domain 320 of binary vehicle identifiers to determine a set of binary vehicle identifiers 330 (e.g., including or excluding the Boolean generated binary strings that are identical to their ancestral binary vehicle identifier).

In the 64-bit example described above, an exemplary binary target identifier 310 may be '1001010100100100101010010000111011000010001100000010010110111100' where bits 32-63 ('10010101001001001 0101001 00001110') of the binary vehicle identifier may correspond to a dealer/distributor in possession of the vehicle (e.g., Dealer ID); bits 15-31 ('11000010001100000') of the binary vehicle identifier may correspond to the zip code where the vehicle is located; bits 9-14 ('010010') of the binary vehicle identifier may correspond to the geographic state the vehicle is located in; bit 8 ('1') of the binary vehicle identifier may correspond to one of two classes of vehicles based on value of vehicle (e.g., new or used; economy or luxury); bit 7 ('1') of the binary vehicle identifier may correspond to a condition of the vehicle (e.g., new or used, accident history or no accident history); and bits 0-6 ('0111100') of the binary vehicle identifier may correspond to the mileage of the vehicle. In this 64-bit example, each binary vehicle identifier with a number of equivalent parameters to the binary target identifier 310 (e.g., one parameter in common, two parameters in common, three parameters in common, four parameters in common, five parameters in common, or six parameters in common) may be selected for set of binary vehicle identifiers 330. In some embodiments, binary vehicle identifiers with less than the number of equivalent parameters may be included in the set 330 based on the total edit distance between dissimilar parameters. For example, the zip code parameter of the binary target identifier may not be equal to the zip code parameter of a binary vehicle identifier, but that binary vehicle identifier may still be selected for the set of binary vehicle identifiers 330 if the difference in the value of the zip code parameters is within a threshold edit distance. The threshold edit distance may be a predefined value, set by input from a user or other party, or determined via machine learning.

Machine learning may be implemented to determine which parameters are similar to others. For example, machine learning (or another statistical model) may determine networks including distances between makes, models, luxury features, or the like, based on a number of factors including, but not limited to, a user's behavior and/or habits (e.g., internet browsing habits), population trends, and input from a user or other party.

Overall, the conversion of vehicles and user preference data 110 to binary vehicle identifiers and binary target identifiers 310 increases the throughput and efficiency of determining a list of vehicles 130 (e.g., determining a set of binary vehicle identifiers 330 and converting the set of binary vehicle identifiers 330 to a list of vehicles 130 via a hashing medium 200). This process may be further enhanced by culling the domain 320 of binary vehicle identifiers before being compared with binary target identifier 310. Binary threshold identifiers may be calculated or determined based on binary target identifier 310 and binary vehicle identifiers above or below the binary threshold identifiers may be culled from domain of vehicle identifiers 320.

In the 8-bit binary vehicle identifier example described above, with a binary target identifier 310, '01000110', binary threshold identifiers may be determined based on information that the user is only interested in cars of a certain make (e.g., Toyota, '0100'). This information may come from user preference data 110, predetermined limits known by determination unit 400, or from user or third-party input. From that information, binary threshold identifiers of '01000000' and '01001111' may be selected. Prior to the comparison, each binary vehicle identifier with a numerical value below '01000000' or above '01001111' may be culled from the domain of binary vehicle identifiers. This operation limits the binary vehicle identifiers that are to be compared to those which correspond to a specific make of vehicle (e.g., Toyota), increasing the efficiency and throughput of determining the set of binary vehicle identifiers 330. Additionally, each binary vehicle identifier of the domain 320 of binary vehicle identifiers may be shifted a number of bits to the right. This allows for the above-described culling operations to be performed at any address of the binary vehicle identifier. The examples described above are merely exemplary, and other culling operations and binary threshold identifiers may be performed on the basis of any of the parameters described herein.

After a set of binary vehicle identifiers 330 has been determined, the set of binary vehicle identifiers 330 may be converted to a list of vehicles 130 via hashing medium 200. Each vehicle of the list of vehicles 130 corresponds to the parameters identified in user preference data 110. In other words, list of vehicles 130 may function as a list of recommended vehicles for the user correlated to user preference data 110. After list of vehicles 130 has been populated, the vehicles in the list of vehicles 130 may be communicated to a user and/or a dealer or other distributor of vehicles. Referring to the exemplary environment shown in FIG. 2, the list of vehicles 130 may be transmitted from system 350 to a user device 150 via network 250. In addition or alternatively, a set of binary vehicle identifiers 330 may be transmitted from system 350 to user device 150 via network 250. The user device 150 may then convert the binary vehicle identifiers 330 to a list of vehicles 130 via hashing medium 200. Database 300 or other memory storage system in communication with, or configured as a subsystem of system 350 and/or determination unit 400, may store a cache of information such as, for example, a set of binary vehicle identifiers 330 or list of vehicles 130 for quicker reference and/or further sorting or categorizing operations. User device 150 may also store a cache of information such as, for example, a set of binary vehicle identifiers 330 or list of vehicles 130.

In some embodiments, system 350 may transmit information regarding one or more vehicles of the list of vehicles 130 via text display, photographic display, hyperlink, video/audio displays, SMS, messaging application or service, email, or any other suitable mechanism to a user, dealer or other party. In this context, other parties may refer to others involved in the distribution of vehicles or users with similar preferences to the user corresponding to the antecedent user preference data 110.

In some embodiments, one or more binary vehicle identifiers within the domain 320 of binary vehicle identifiers may be edited to reflect a change in the parameters of the vehicles corresponding to the edited binary vehicle identifier. The edited binary vehicle identifiers may be stored and edited within database 300. After the binary vehicle identifier is edited from a first version to a second version it may be compared to the first version. If the edit distance between the first version and the second version is above a threshold value, database 300 or a system or application in communication with database 300 may transmit information regarding updated parameters of the vehicle via text display, photographic display, hyperlink, video/audio displays, SMS, messaging application or service, email, or any other suitable mechanism to a user, dealer or other party. In some embodiments, set of binary vehicle identifiers 330 and the list of vehicles 130, may be updated to reflect changes to binary vehicle identifiers within the set 330 or changes to binary vehicle identifiers not within the set 330, but with the domain 320 of binary vehicle identifiers.

In some embodiments, the binary target identifier 310 may be received by a database 300, and database 300 may include the domain 320 of binary vehicle identifiers. Determination unit 400 may be a component of database 300. For example, determination unit 400 may include a series of transistors or other processing units within database 300 which can compare binary target identifier 310 with domain of vehicle identifiers 320 and determine set of binary vehicle identifiers 330. In some embodiments, database 300 and determination unit 400 exist as subsets of the same system (e.g., system 350 of FIG. 2). Determination unit 400 may be coupled to database 300 via, for example, a local connection or the internet. In some embodiments, database 300 may be accessed by any system or application connected to the internet.

Figure 2:
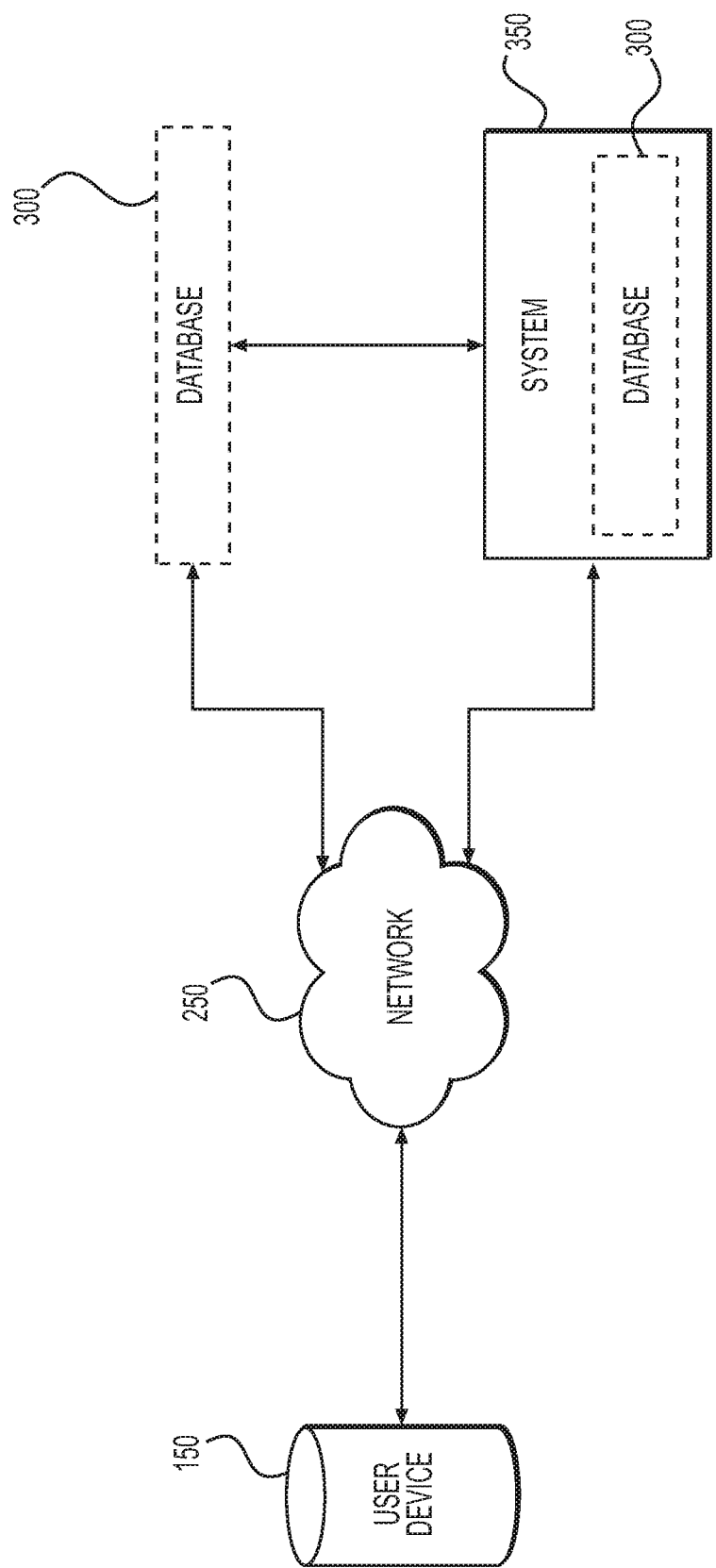
FIG. 2 depicts an example environment in which methods, systems, and other aspects of the present disclosure may be implemented.

A flowchart of an exemplary method 500 for determining a set of vehicle identifiers 330 is shown in FIG. 2. The method 500 may include receiving data, wherein the received data is indicative of a user's vehicle preferences (step 510). The received data may be, for example, user preference data 110 and may comprise one or more parameters related to a user's vehicle preferences. In some embodiments, the data is received at a database 300. The method 500 may further include converting the received data to a binary target identifier 310 (step 520). The data may be converted via a hashing medium 200. Hashing medium 200 may include one or more hashing functions, reference media, lookup tables, bitmasks, or combinations thereof. The method 500 may further include comparing the binary target identifier to a domain of binary vehicle identifiers (step 530). In some embodiments, method 500 also may include determining a set of binary vehicle identifiers 330 of the domain 320 of binary vehicle identifiers (step 540). This determination may be based on the comparing step and may be performed by determination unit 400.

As noted above, this disclosure is not limited to the context of vehicles. The above described methods and systems may be implemented to provide any set of items from a domain of items based on input criteria. This may be used to provide recommendations for other items, such as, for example, home theaters, mattresses, boats, computers, or real estate. In some embodiments, these methods and systems may be implemented to populate a list of users from data indicative of one or more users.

Figure 3:
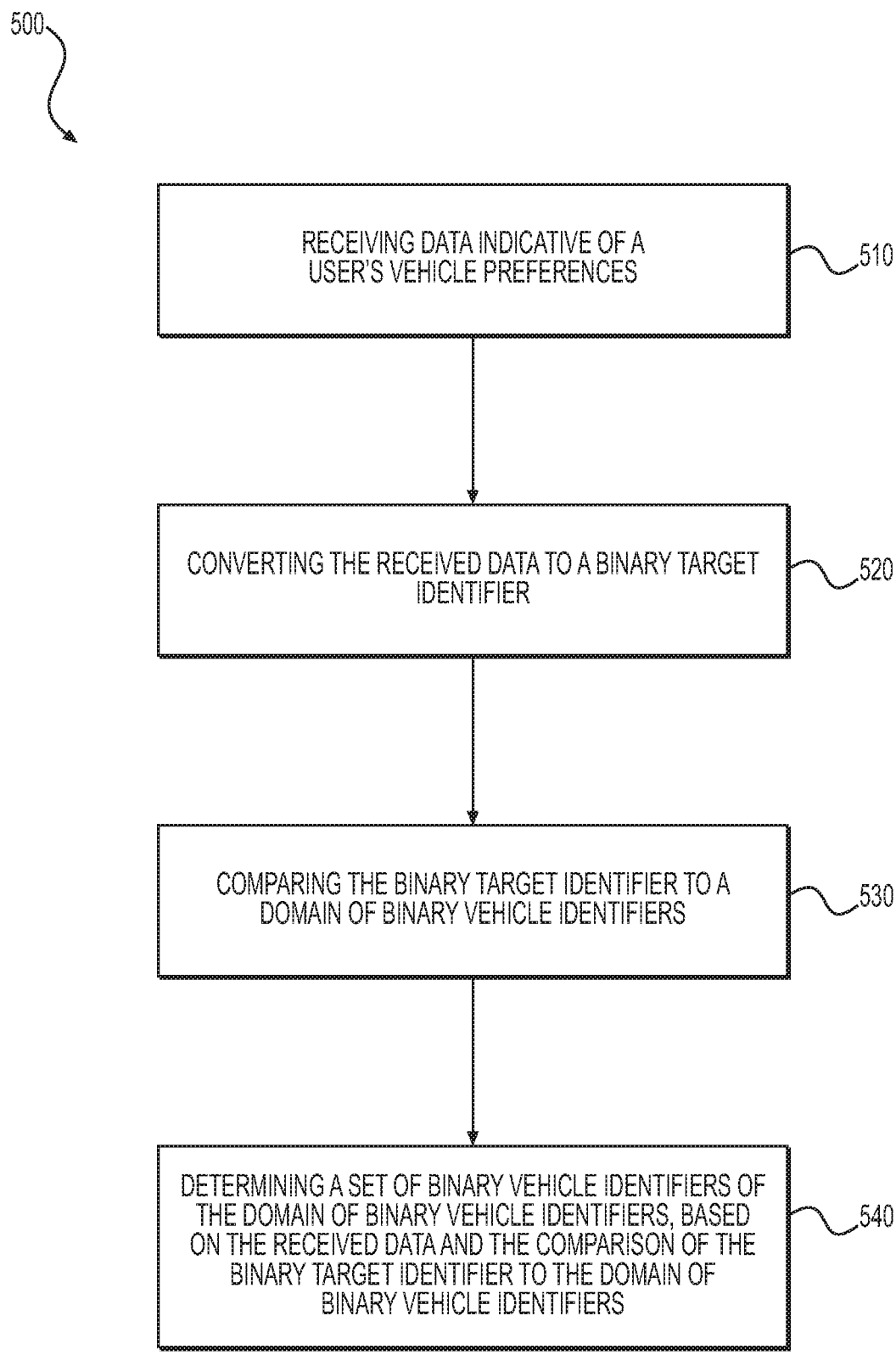
FIGS. 3-4 are flow charts showing exemplary methods for providing personalized purchase recommendations, according to one or more embodiments.

A flowchart of an exemplary method 600 for populating a list of users is shown in FIG. 3. The method 600 may include receiving data, wherein the received data is indicative of a user (step 610). The received data may be, for example, data related to the location, credit score, customer history, in-store interactions, vehicle ownership history, and/or large purchase history of one or more users. In some embodiments, the data is received at a database 300. The method 600 may further include converting the received data to a binary target identifier 310 (step 620). The data may be converted via a hashing medium 200. Hashing medium 200 may include one or more hashing functions, reference media, lookup tables, bitmasks, or combinations thereof. The method 600 may further include comparing the binary target identifier to a domain of binary user identifiers (step 630). In some embodiments, method 600 also may include determining a set of binary user identifiers of the domain of binary user identifiers (step 640). This determination may be based on the comparing step and may be performed by determination unit 400. The method 600 may further include populating a list of users, wherein each user of the list of users corresponds to a binary user identifier of the set of binary user identifiers (step 650). In some embodiments, the set of binary user identifiers may be converted to a list of users via hashing medium 200.

Figure 4:
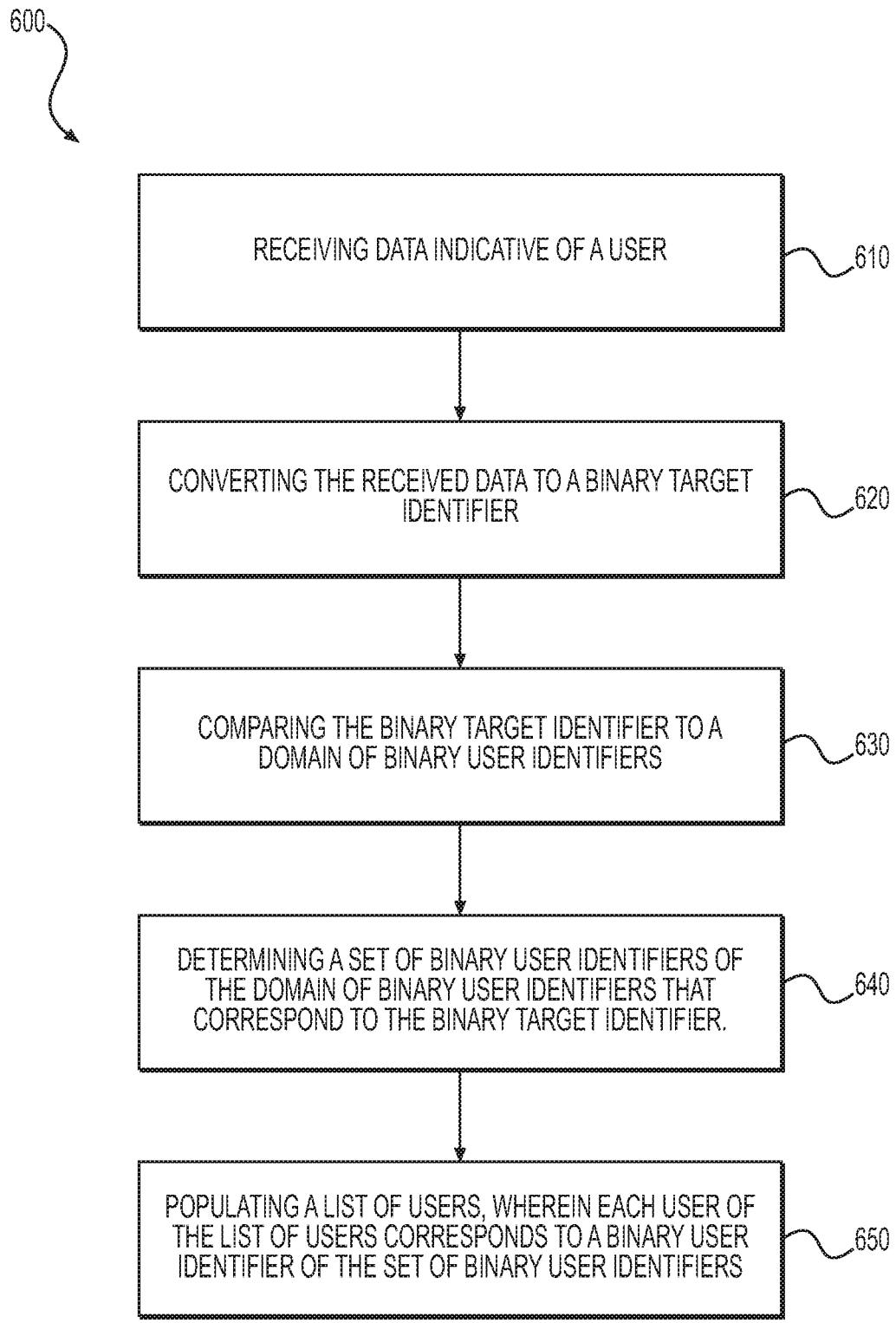

In general, any process discussed in this disclosure that is understood to be performable by a computer may be performed by one or more processors. Such processes include, but are not limited to: the processes shown in FIGS. 1, 3, and 4; and processes involving operations of the database 300, the determination unit 400, and the hashing medium 200. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for determining a set of vehicle identifiers, the method comprising:
   receiving data, wherein the received data is indicative of a user's vehicle preferences, and includes a respective value for each of a plurality of parameters related to the user's vehicle preferences;
   converting the received data to a binary target identifier via a hashing medium;
   comparing the binary target identifier to a domain of binary vehicle identifiers, wherein the binary target identifier and each binary vehicle identifier in the domain of binary vehicle identifiers is a respective binary number configured to store information related to a plurality of vehicle parameters, each parameter in the plurality of vehicle parameters corresponding to a respective address of one or more bits within the respective binary number;
   based on the received data and the comparison of the binary target identifier to the domain of binary vehicle identifiers, determining a set of binary vehicle identifiers of the domain of binary vehicle identifiers; and
   populating a list of vehicles, wherein each vehicle of the list of vehicles corresponds to a respective binary vehicle identifier of the set of binary vehicle identifiers:
   wherein the converting includes:
      converting the respective value for each of the plurality of parameters in the received data into a respective binary value; and
      inserting the respective binary value for each of the plurality of parameters into the respective address in the binary target identifier corresponding to each parameter.

2. The computer-implemented method of claim 1, wherein the received data comprises a respective value for one or more parameters related to vehicle make, vehicle model, vehicle mileage, zip code of vehicle, dealer in possession of vehicle, value of vehicle, condition of vehicle, one or more vehicular luxury features, or combinations thereof.

3. The computer-implemented method of claim 1, wherein each binary vehicle identifier of the set of binary vehicle identifiers is within a predetermined threshold edit distance from the binary target identifier.

4. The computer-implemented method of claim 1, wherein the received data includes respective values of at least 5 parameters related to the user's vehicle preferences.

5. The computer-implemented method of claim 4, wherein the binary target identifier is less than or equal to 64 bits.

6. The computer-implemented method of claim 1, wherein the set of binary vehicle identifiers is converted to a list of vehicles via the hashing medium.

7. The computer-implemented method of claim 1, wherein each binary vehicle identifier of the domain of binary vehicle identifiers is within a predetermined threshold edit distance from the binary target identifier.

8. The computer-implemented method of claim 1, further comprising parsing of the binary target identifier into a plurality of binary numbers, each binary number of the plurality comprising a respective value of one or more parameters related to vehicle make, vehicle model, vehicle mileage, zip code of vehicle, dealer in possession of vehicle, value of vehicle, condition of vehicle, and/or one or more luxury features of the vehicle.

9. A computer system comprising:
a memory storing instructions; and
one or more processors configured to execute the instructions to perform operations, the operations including:
converting data, the data including a respective value for each of a plurality of parameters related to a user's vehicle preferences, to a binary target identifier via a hashing medium;
comparing the binary target identifier to a domain of binary vehicle identifiers, wherein the binary target identifier and each binary vehicle identifier in the domain of binary vehicle identifiers is a respective binary number configured to store information related to a plurality of vehicle parameters, each parameter in the plurality of vehicle parameters corresponding to a respective address of one or more bits within the respective binary number;
determining a set of binary vehicle identifiers of the domain of binary vehicle identifiers, that correspond to the binary target identifier; and
populating a list of vehicles, wherein each vehicle of the list of vehicles corresponds to a binary vehicle identifier of the set of binary vehicle identifiers;
wherein the converting includes:
converting the respective value for each of the plurality of parameters in the data into a respective binary value; and
inserting the respective binary value for each of the plurality of parameters into the respective address in the binary target identifier corresponding to each parameter.

10. The computer system of claim 9, wherein the set of binary vehicle identifiers is converted to a list of vehicles via the hashing medium.

11. The computer system of claim 9, wherein the determining the set of binary vehicle identifiers of the domain of binary vehicle identifiers that corresponds to the binary target identifier includes applying machine learning to determine which set of binary vehicle identifiers correspond to the binary target identifier.

12. The computer system of claim 9, wherein the converted data, after conversion, occupies less bits than the data prior to the conversion.

13. The computer system of claim 9, wherein the data, prior to and after conversion, comprises a respective value of one or more parameters related to vehicle make, vehicle model, vehicle mileage, zip code of vehicle, dealer in possession of vehicle, value of vehicle, condition of vehicle, one or more vehicular luxury features, or combinations thereof.

14. The computer system of claim 9, further comprising culling the domain of binary vehicle identifiers by removing values above and/or below one or more binary threshold identifiers.

15. The computer system of claim 14, wherein one or more binary threshold identifiers are calculated based on the binary target identifier.

16. The computer system of claim 9, wherein each binary vehicle identifier of the domain of binary vehicle identifiers comprises one or more of: thirty-two bits related to a dealer in possession of vehicle; seventeen bits related to a zip code of vehicle, six bits related to a state of vehicle, one bit related to a vehicle pricing, one bit related to a vehicle status condition, or seven bits related to a vehicle mileage.

17. A non-transitory computer-readable medium storing instructions that, when executed by one or more processors of a computer system, cause the one or more processors to perform operations comprising:
receiving data, wherein the received data is indicative of a user, and includes a respective value for each of a plurality of parameters related to the user's vehicle preferences;
converting the received data to a binary target identifier via a hashing medium;
comparing the binary target identifier to a domain of binary user identifiers, wherein the binary target identifier and each binary user identifier in the domain of binary user identifiers is a respective binary number configured to store information related to a plurality of parameters, each parameter in the plurality of parameters corresponding to a respective address of one or more bits within the respective binary number;
determining a set of binary user identifiers of the domain of binary user identifiers that correspond to the binary target identifier; and
populating a list of users, wherein each user of the list of users corresponds to a binary user identifier of the set of binary user identifiers;
wherein the converting includes:
converting the respective value for each of the plurality of parameters in the received data into a respective binary value; and
inserting the respective binary value for each of the plurality of parameters into the respective address in the binary target identifier corresponding to each parameter.

* * * * *